(12) United States Patent
Higuchi et al.

(10) Patent No.: US 7,157,146 B2
(45) Date of Patent: Jan. 2, 2007

(54) PRIMER COMPOSITION, COATING METHOD, AND COATED ARTICLE

(75) Inventors: Koichi Higuchi, Gunma-ken (JP); Masahiro Furuya, Gunma-ken (JP); Masaaki Yamaya, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 413 days.

(21) Appl. No.: 10/680,262

(22) Filed: Oct. 8, 2003

(65) Prior Publication Data

US 2004/0071998 A1 Apr. 15, 2004

(30) Foreign Application Priority Data

Oct. 9, 2002 (JP) ............................. 2002-295905

(51) Int. Cl.
  *B32B 9/04* (2006.01)
(52) U.S. Cl. .................. 428/447; 428/412; 428/423.1; 428/424.4; 428/515; 428/522; 525/203; 525/204; 525/209; 525/210; 525/220; 525/326.5; 525/342; 526/279; 526/258; 526/261; 526/316; 528/34
(58) Field of Classification Search .................. None
  See application file for complete search history.

(56) References Cited

U.S. PATENT DOCUMENTS

| | | | |
|---|---|---|---|
| 4,353,959 A | 10/1982 | Olson et al. | |
| 4,960,809 A | 10/1990 | Yamaya et al. | |
| 5,021,266 A | 6/1991 | Yamaya et al. | |
| 5,191,045 A * | 3/1993 | Funaki et al. | 526/259 |
| 5,250,359 A | 10/1993 | Funaki et al. | |
| 5,420,204 A * | 5/1995 | Valet et al. | 525/125 |
| 6,372,355 B1 * | 4/2002 | Noda et al. | 428/447 |
| 2002/0051889 A1* | 5/2002 | Kanamori et al. | 428/447 |

FOREIGN PATENT DOCUMENTS

| | | |
|---|---|---|
| EP | 1 036 834 A | 9/2000 |
| EP | 1 122 278 A | 8/2001 |
| EP | 1 122 278 A2 | 8/2001 |
| JP | 56-92059 A | 7/1981 |
| JP | 1-149878 A | 6/1989 |
| JP | 8-151415 A | 6/1996 |
| JP | 3102696 B2 | 8/2000 |
| JP | 2001-114841 A | 4/2001 |
| JP | 2001-214122 A | 8/2001 |
| JP | 2001-234072 * | 8/2001 |

* cited by examiner

*Primary Examiner*—Marc S. Zimmer
(74) *Attorney, Agent, or Firm*—Birch, Stewart, Kolasch & Birch, LLP

(57) ABSTRACT

A primer composition comprises (A) a vinyl copolymer obtained through copolymerization of (a-1) a UV-absorbing vinyl monomer, (a-2) an alkoxysilyl group-containing vinyl monomer, and (a-3) another copolymerizable monomer, (B) a curing agent, and (C) a thermoplastic vinyl resin having a Tg of at least 80° C. Polycarbonate resin articles, when covered with an undercoat of the primer composition and an overcoat of an organopolysiloxane composition, exhibit improved transparency, mar resistance, weather resistance, and chemical resistance and find outdoor use as vehicle and building windows and windshields.

16 Claims, No Drawings

PRIMER COMPOSITION, COATING METHOD, AND COATED ARTICLE

This invention relates to primer compositions for allowing silicone coatings to be formed on plastic substrates for forming mar and weather-resistant protective coatings, a coating method using the primer compositions, and coated articles.

BACKGROUND OF THE INVENTION

As glazing substitutes, shatterproof or highly shatter resistant transparent materials have been widely utilized for these decades. For example, plastic substrates, especially polycarbonate resins have superior transparency, impact resistance and heat resistance and are currently used as structural members instead of glass in a variety of applications including building and vehicle windows and instrument covers.

The polycarbonate resins, however, are inferior to glass in surface properties such as mar resistance and weather resistance. It is desired to improve the surface properties of polycarbonate resin parts. Nowadays, polycarbonate resin parts for use as vehicle windows and acoustic barrier walls along highways are required to withstand more than 10 years of weathering.

Known means for improving the weather resistance of polycarbonate resin parts include the lamination of a weather resistant acrylic resin film on the surface of a polycarbonate resin substrate and the formation of a ultraviolet absorber-containing resin layer on the resin surface, for example, by co-extrusion.

For improving the mar resistance of polycarbonate resin parts, it is known to coat thermosetting resins such as polyorganosiloxanes and melamine resins and to coat photocurable resins such as polyfunctional acrylic resins.

As to the manufacture of transparent articles having both weather resistance and mar resistance, JP-A 56-92059 and JP-A 1-149878 disclose ultraviolet-absorbing transparent substrates having a primer layer loaded with a large amount of UV absorber and a protective coating of colloidal silica-laden polysiloxane paint overlying the primer layer.

However, several problems arise with this approach. The addition of a large amount of UV absorber to the primer layer can adversely affect the adhesion of the primer layer to the substrate or the overlying protective coating of colloidal silica-laden polysiloxane. During heat curing step, the UV absorber can volatilize off. On outdoor use over a long period of time, the UV absorber will gradually bleed out, causing undesired impacts like cracking, whitening or yellowing. From the mar resistance standpoint, it is impossible to add a large amount of UV absorber to the protective coating of colloidal silica-laden polysiloxane.

It is also known from JP-A 8-151415 that a mixture of a benzotriazole-derived UV absorbing vinyl monomer or a benzophenone-derived UV absorbing vinyl monomer and another vinyl monomer copolymerizable therewith is used in coating compositions, which are effective for forming protective coatings on surfaces of synthetic resins. Since these protective coatings are based on vinyl polymers, their mar resistance is limited.

JP-A 2001-114841, Japanese Patent No. 3,102,696, and JP-A 2001-214122 disclose coating compositions comprising copolymers of a benzotriazole-derived UV absorbing vinyl monomer or a benzophenone-derived UV absorbing vinyl monomer, an alkoxysilyl group-containing vinyl monomer, and another vinyl monomer copolymerizable therewith. Allegedly they form weather resistant coatings on resin substrates in tight adhesion for yielding multilayer-coated resin articles.

JP-A 2000-114841 lacks examples of using a copolymer coating composition as the undercoat. Because of the vinyl polymer, the coating of this composition alone is limited in mar resistance improvement.

In Japanese Patent No. 3,102,696, a coated article endowed with mar resistance and weather resistance is obtained by using a copolymer coating composition as a primer and forming a colloidal silica-laden polysiloxane resin coating thereon. The weather resistant coating suppresses yellowing. However, the primer layer can become extremely hard due to the crosslinked network of alkoxysilyl groups, or undergo post-crosslinking of residual alkoxysilyl or hydroxysilyl groups over time. Thus the coating is likely to strain, allowing frequent failures like cracks and stripping. Long-term weather resistance is still insufficient.

Also in JP-A 2001-214122, an article is coated with a colloidal silica-laden polysiloxane resin coating subsequent to a copolymer coating composition as a primer. The weather resistant coating suppresses yellowing. However, the coating fails to follow environmental temperature changes, especially changes at relatively high temperature, allowing frequent failures like cracks and stripping.

SUMMARY OF THE INVENTION

Therefore, an object of the invention is to provide a primer composition for forming a protective coating having improved mar and weather resistance and devoid of drawbacks such as cracking, stripping and yellowing over time. Another object is to provide a coating method and a coated article using the same.

It has been found that desired long-term weather resistance and mar resistance are achievable by the use of a primer composition comprising as essential components (A) a vinyl copolymer obtained through copolymerization of (a-1) 5 to 40% by weight of a UV-absorbing vinyl monomer, (a-2) 1 to 50% by weight of an alkoxysilyl group-containing vinyl monomer, and (a-3) 10 to 94% by weight of another monomer copolymerizable with the foregoing vinyl monomers, (B) a curing agent capable of reacting with the vinyl copolymer, and (C) a thermoplastic vinyl resin having a glass transition temperature (Tg) of at least 80° C., and by laying a polysiloxane resin coating on a coating of the primer composition.

More particularly, the inventors studied primer compositions for improving the adhesion and weather resistance of organopolysiloxane base coatings which are formed on molded parts of thermoplastic resins, typically polycarbonate. The use of the above-described vinyl copolymer (A) as one component of the primer has the following advantages. Since UV-absorbing groups are attached to the polymer backbone through chemical bonds and do not migrate to the surface, a whitening phenomenon of outer appearance and a loss of adhesion are eliminated. Since the copolymer is not dissolved in water and solvents, the amount of the copolymer is kept unchanged from the initial charge over a long period, eliminating a lowering of the UV-absorbing effect over time. The UV absorber does not volatilize off the coating even in heat-curing treatment at elevated temperature. Since the copolymer constructed as above is fully compatible with other components of the primer, it can be added in large amounts without adversely affecting the adhesion of the primer coating to the substrate and the overlying protective coating and the transparency thereof.

Since the vinyl copolymer has alkoxysilyl groups introduced therein due to the use of an alkoxysilyl group-containing vinyl monomer, the primer coating layer is endowed with a reactivity with the overlying organopolysiloxane base protective coating layer and enhanced in adhesion. Additionally, the crosslinking between alkoxysilyl groups contributes to improved heat resistance and durability.

It has also been found that when a compound containing a nitrogen atom and an alkoxysilyl group in a molecule is used as the curing agent (B) capable of reacting with the vinyl copolymer (A), the primer coating layer is endowed with water-resistant good adhesion. This compound crosslinks with coating is densified. If such crosslinking reaction is promoted, the amount of residual alkoxysilyl groups in the coating is reduced so that cracking by post-crosslinking over time is suppressed. The crosslinking also serves to fix any optional components like UV absorber and light stabilizer within the primer coating layer. Since a large quantity of UV-absorbing groups can be introduced into the primer layer while maintaining desirable properties as mentioned above, it becomes possible to avoid the positive addition of a UV absorber (having a detrimental effect on mar resistance) to the organopolysiloxane base coating or to minimize the amount of such UV absorber added.

It has also been found that the incorporation of the thermoplastic vinyl resin (C) having a Tg of at least 80° C. imparts flexibility to the primer coating, reduces the influence of environmental temperature changes, especially phase changes in a relatively high temperature region at or above 60° C., and a softening phenomenon, and suppresses the strain within the primer coating and at the interface thereof with the overlying coat. The last-mentioned effect eventually prevents the overlying organopolysiloxane base protective coating from cracking. The primer coating itself is endowed with heat resistance and water resistance, resulting in significantly improved adhesion under humidity and heat.

In a first aspect, the present invention provides a primer composition comprising as essential components, (A) a vinyl copolymer obtained through copolymerization of (a-1) 5 to 40% by weight of a UV-absorbing vinyl monomer, (a-2) 1 to 50% by weight of an alkoxysilyl group-containing vinyl monomer, and (a-3) 10 to 94% by weight of another monomer copolymerizable with the foregoing monomers, (B) a curing agent capable of reacting with the vinyl copolymer (A), and (C) a thermoplastic vinyl resin having a glass transition temperature of at least 80° C.

In a preferred embodiment, the UV-absorbing vinyl monomer (a-1) is a UV-absorbing vinyl monomer derived from a benzotriazole.

In a preferred embodiment, the curing agent (B) is a compound containing a nitrogen atom and an alkoxysilyl group in a molecule; the reaction product obtained through amidation of the reaction product of an amino-functional alkoxysilane, an epoxy-functional alkoxysilane, and a silylating agent with a carboxylic acid halide or carboxylic anhydride; or the reaction product of an amino-functional alkoxysilane with a dicarboxylic anhydride.

In a preferred embodiment, the thermoplastic vinyl resin (C) is a thermoplastic vinyl resin obtained through copolymerization of 1 to 30% by weight of either one or both of (c-1) a UV-absorbing vinyl monomer and (c-2) a cycloalkyl group-containing vinyl monomer, and (c-3) 70 to 99% by weight of another monomer copolymerizable with the foregoing monomers and having a glass transition temperature of at least 80° C. The UV-absorbing vinyl monomer (c-1) is typically a UV-absorbing vinyl monomer derived from a benzotriazole. The cycloalkyl group-containing vinyl monomer (c-2) is typically selected from among cyclohexyl acrylate, cyclohexyl methacrylate, dicyclopentanyl acrylate, dicyclopentanyl methacrylate, isobornyl acrylate, isobornyl methacrylate, adamantyl acrylate, and adamantyl methacrylate, and mixtures thereof.

In a second aspect, the present invention provides a method for providing a plastic substrate with a weather resistant, abrasion resistant coating, comprising the steps of (i) applying an organic solvent solution of the primer composition defined above onto a plastic substrate, (ii) evaporating the solvent and curing the primer coating, (iii) applying an organopolysiloxane composition to the primer coating, and (iv) heating at a temperature sufficient for the composition to cure. The organopolysiloxane composition comprises a hydrolyzate or co-hydrolyzate of an organooxysilane having the general formula (1):

$$(R^4)_m Si(OR^5)_{4-m} \qquad (1)$$

wherein $R^4$ is an organic group having 1 to 10 carbon atoms, $R^5$ is hydrogen or a monovalent organic group, and m is 0, 1 or 2, and optionally, colloidal silica.

In a third aspect, the present invention provides a resin coated article comprising at least two resin layers on a surface of a plastic substrate, wherein of the at least two resin layers, a first layer which is contiguous to the substrate surface is a cured resin layer of the primer composition defined above, and a second layer which is contiguous to the first layer is a cured resin layer of an organopolysiloxane composition comprising a hydrolyzate or co-hydrolyzate of an organooxysilane having the general formula (1):

$$(R^4)_m Si(OR^5)_{4-m} \qquad (1)$$

wherein $R^4$ is an organic group having 1 to 10 carbon atoms, $R^5$ is hydrogen or a monovalent organic group, and m is 0, 1 or 2, and optionally, colloidal silica.

The plastic substrate typically comprises a polycarbonate resin.

DESCRIPTION OF THE PREFERRED EMBODIMENTS

The primer composition of the invention is defined as comprising (A) a vinyl copolymer obtained through copolymerization of (a-1) 5 to 40% by weight of a UV-absorbing vinyl monomer, (a-2) 1 to 50% by weight of an alkoxysilyl group-containing vinyl monomer, and (a-3) 10 to 94% by weight of another monomer copolymerizable with the foregoing monomers, (B) a curing agent capable of reacting with the vinyl copolymer (A), and (C) a thermoplastic vinyl resin having a Tg of at least 80° C. as essential components.

The UV-absorbing vinyl monomer (a-1) is not critical as long as it is a compound having at least one UV absorbing group and at least one vinyl group per molecule. Preferred compounds include benzotriazole derivatives of the following general formula (2) and benzophenone derivatives of the following general formula (3).

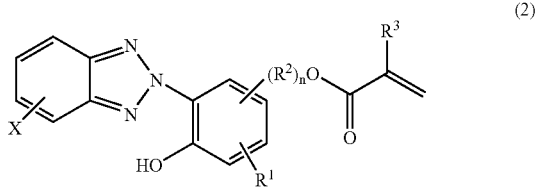

(2)

In formula (2), X is hydrogen or chlorine. $R^1$ is hydrogen, methyl or a tertiary alkyl group having 4 to 8 carbon atoms. $R^2$ is a straight or branched alkylene group having 2 to 10 carbon atoms. $R^3$ is hydrogen or methyl. The subscript n is 0 or 1.

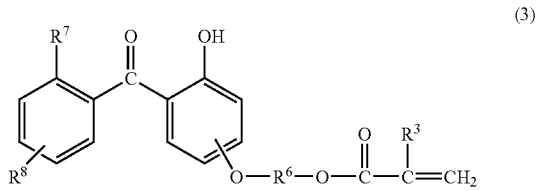

(3)

In formula (3), $R^3$ is as defined above. $R^6$ is a substituted or unsubstituted straight or branched alkylene group having 2 to 10 carbon atoms. $R^7$ is hydrogen or hydroxyl. $R^8$ is hydrogen, hydroxyl or an alkoxy group having 1 to 6 carbon atoms.

Examples of suitable benzotriazole derivatives of formula (2) include, but are not limited to, 2-(2'-hydroxy-5'-(meth)acryloxyphenyl)-2H-benzotriazole, 2-(2'-hydroxy-3'-tert-butyl-5'-(meth)acryloxymethylphenyl)-2H-benzotriazole, 2-[2'-hydroxy-5'-(2-(meth)acryloxyethyl)phenyl]-2H-benzotriazole, 2-[2'-hydroxy-3'-tert-butyl-5'-(2-(meth)acryloxyethyl)-phenyl]-5-chloro-2H-benzotriazole, and 2-[2'-hydroxy-3'-methyl-5'-(8-(meth)acryloxyoctyl)phenyl]-2H-benzotriazole.

Examples of suitable benzophenone derivatives of formula (3) include, but are not limited to, 2-hydroxy-4-(2-(meth)acryloxyethoxy)benzophenone, 2-hydroxy-4-(4-(meth)acryloxybutoxy)benzophenone, 2,2'-dihydroxy-4-(2-(meth)acryloxyethoxy)benzophenone, 2,4-dihydroxy-4'-(2-(meth)acryloxyethoxy)benzophenone, 2,2',4-trihydroxy-4'-(2-(meth)acryloxyethoxy)benzophenone, 2-hydroxy-4-(3-(meth)acryloxy-2-hydroxypropoxy)benzophenone, and 2-hydroxy-4-(3-(meth)acryloxy-1-hydroxypropoxy)benzophenone.

As the UV-absorbing vinyl monomer (a-1), benzotriazole derivatives of formula (2) are preferred, with 2-[2'-hydroxy-5'-(2-(meth)acryloxyethyl)phenyl]-2H-benzotriazole being most preferred.

The UV-absorbing vinyl monomers may be used alone or in admixture of any.

The content of UV-absorbing vinyl monomer (a-1) in the vinyl copolymer (A) is in a range of 5 to 40% by weight, preferably 6 to 30% by weight of the copolymer composition when the compatibility of the vinyl copolymer with other components of the primer composition and the weather resistance and other properties of the resulting primer composition are taken into account. More than 40% by weight of monomer (a-1) may result in a copolymer which is less compatible with other components and be uneconomical. Less than 5% by weight of monomer (a-1) may fail to provide desired weather resistance.

The alkoxysilyl group-containing vinyl monomer (a-2) is not critical as long as it is a compound having at least one alkoxysilyl group and at least one vinyl polymerizable group per molecule. Typical monomers are compounds having the following general formula (4).

(4)

In formula (4), $R^9$ is a polymerizable unsaturated group such as (meth)acryloxy, vinyl, vinyloxy or styryl, $R^{10}$ is a straight or branched alkylene group having 1 to 10 carbon atoms; $R^{11}$ and $R^{12}$ are each independently an alkyl group having 1 to 6 carbon atoms; L is an integer of 1 to 3; and n is 0 or 1.

Of the alkoxysilyl group-containing vinyl monomers (a-2), examples of (meth)acrylic functional compounds include 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-acryloxypropyltrimethoxysilane, 3-acryloxypropyltriethoxysilane, 3-acryloxypropylmethyldimethoxysilane, 3-acryloxypropylmethyldiethoxysilane, 3-methacryloxymethyltrimethoxysilane, 3-methacryloxymethyltriethoxysilane, 3-methacryloxymethylmethyldimethoxysilane, 3-methacryloxymethylmethyldiethoxysilane, 3-acryloxymethyltrimethoxysilane, 3-acryloxymethyltriethoxysilane, 3-acryloxymethylmethyldimethoxysilane, and 3-acryloxymethylmethyldiethoxysilane. Of these, 3-methacryloxypropyltrimethoxysilane and 3-methacryloxypropylmethyldimethoxysilane are preferred for ease of handling, crosslinked density and reactivity.

Examples of vinyl functional compounds include vinyltrimethoxysilane, vinyltriethoxysilane, vinyltris (2-methoxyethoxy)silane, vinylmethyldimethoxysilane, vinylmethyldiethoxysilane, vinylmethylbis (2-methoxyethoxy)silane, 3-vinyloxypropyltrimethoxysilane, 3-vinyloxypropyltriethoxysilane, 3-vinyloxypropylmethyldimethoxysilane, 3-vinyloxypropylmethyldiethoxysilane, styrylethyltrimethoxysilane, and styryltrimethoxysilane. Of these, vinyltrimethoxysilane, vinyltriethoxysilane, and 3-vinyloxypropyltrimethoxysilane are preferred for ease of handling and reactivity.

The content of alkoxysilyl group-containing vinyl monomer (a-2) in the vinyl copolymer (A) is in a range of 1 to 50% by weight of the copolymer composition. Less than 1% by weight of monomer (a-2) is too small to improve heat resistance and durability. More than 50% by weight of monomer (a-2) may result in too high crosslinked density, too high hardness, and less adherence and allow alkoxysilyl or hydroxysilyl groups to be left unreacted, which allows post-crosslinking to take place with the passage of time, incurring cracks.

The other monomer (a-3) copolymerizable with the foregoing monomers (a-1) and (a-2) is not critical as long as it is a copolymerizable monomer. Typical monomers include (meth)acrylic monomers having a cyclic hindered amine structure, (meth)acrylic acid esters, (meth)acrylonitriles, (meth)acrylamides, alkyl vinyl ethers, alkyl vinyl esters, styrene, and derivatives thereof.

Examples of suitable (meth)acrylic monomers having a cyclic hindered amine structure are 2,2,6,6-tetramethyl-4-piperidinyl methacrylate and 1,2,2,6,6-pentamethyl-4-piperidinyl methacrylate. These monomers may be used in admixture of two or more.

Examples of suitable (meth)acrylates and derivatives thereof include (meth)acrylates of monohydric alcohols such as methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, n-pentyl (meth)acrylate, isopentyl (meth)acrylate, n-hexyl (meth)acrylate, isohexyl (meth)acrylate, n-heptyl (meth)acrylate, isoheptyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-undecyl (meth)acrylate, n-dodecyl (meth)acrylate, lauryl (meth)acrylate, palmityl (meth)acrylate, stearyl (meth)acrylate, cyclohexyl (meth)acrylate, 4-methylcyclohexyl (meth)acrylate, 4-t-butylcyclohexyl (meth)acrylate, isobornyl (meth)acrylate, dicyclopentanyl (meth)acrylate, dicyclopentenyloxyethyl (meth)acrylate, and benzyl (meth)acrylate;

(meth)acrylates of alkoxy(poly)alkylene glycols such as 2-methoxyethyl (meth)acrylate, 2-methoxypropyl (meth)acrylate, 3-methoxypropyl (meth)acrylate, 2-methoxybutyl (meth)acrylate, 3-methoxybutyl (meth)acrylate, 4-methoxybutyl (meth)acrylate, methoxypolyethylene glycol (meth)acrylate (e.g., the number of ethylene glycol units is 2 to 20), and methoxypolypropylene glycol (meth)acrylate (e.g., the number of propylene glycol units is 2 to 20);

mono(meth)acrylates of polyhydric alcohols such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, glycerin mono(meth)acrylate, pentaerythritol mono(meth)acrylate, polyethylene glycol mono(meth)acrylate (e.g., the number of ethylene glycol units is 2 to 20), and polypropylene glycol mono(meth)acrylate (e.g., the number of propylene glycol units is 2 to 20);

poly(meth)acrylates of polyhydric alcohols such as ethylene glycol di(meth)acrylate, propylene glycol di(meth)acrylate, butylene glycol di(meth)acrylate, glycerin di(meth)acrylate, glycerin tri(meth)acrylate, pentaerythritol di(meth)acrylate, pentaerythritol tetra(meth)acrylate, 1,4-cyclohexane diol di(meth)acrylate, polyethylene glycol di(meth)acrylate (e.g., the number of ethylene glycol units is 2 to 20), and polypropylene glycol di(meth)acrylate (e.g., the number of propylene glycol units is 2 to 20);

(poly)esters of non-polymerizable polybasic acids with hydroxyalkyl (meth)acrylates, such as mono[2-(meth)acryloyloxyethyl] succinate, di[2-(meth)acryloyloxyethyl] succinate, mono[2-(meth)acryloyloxyethyl] adipate, di[2-(meth)acryloyloxyethyl] adipate, mono[2-(meth)acryloyloxyethyl] phthalate, and di[2-(meth)acryloyloxyethyl] phthalate;

amino group-containing (meth)acrylates such as 2-aminoethyl (meth)acrylate, 2-(N-methylamino)ethyl (meth)acrylate, 2-(N,N-dimethylamino)ethyl (meth)acrylate, 2-(N-ethylamino)ethyl (meth)acrylate, 2-(N,N-diethylamino)ethyl (meth)acrylate, 3-(N,N-dimethylamino)propyl (meth)acrylate, and 4-(N,N-dimethylamino)butyl (meth)acrylate; and epoxy group-containing (meth)acrylates such as glycidyl (meth)acrylate.

Examples of suitable (meth)acrylonitrile derivatives include α-chloroacrylonitrile, α-chloromethylacrylonitrile, α-trifluoromethylacrylonitrile, α-methoxyacrylonitrile, α-ethoxyacrylonitrile, and vinylidene cyanide. Examples of suitable (meth)acrylamide derivatives include N-methyl (meth)acrylamide, N,N-dimethyl(meth)acrylamide, N-ethyl (meth)acrylamide, N,N-diethyl(meth)acrylamide, N-methoxy(meth)acrylamide, N,N-dimethoxy(meth)acrylamide, N-ethoxy(meth)acrylamide, N,N-diethoxy(meth)acrylamide, diacetone (meth)acrylamide, N-methylol (meth)acrylamide, N-(2-hydroxyethyl)(meth)acrylamide, N,N-dimethylaminomethyl(meth)acrylamide, N-(2-dimethylamino) ethyl(meth)acrylamide, N,N'-methylenebis(meth) acrylamide, and N,N'-ethylenebis(meth)acrylamide. Examples of suitable alkyl vinyl ethers include methyl vinyl ether, ethyl vinyl ether, butyl vinyl ether, and hexyl vinyl ether. Examples of suitable alkyl vinyl esters include vinyl formate, vinyl acetate, vinyl acrylate, vinyl lactate, vinyl caproate, and vinyl stearate. Examples of styrene and derivatives thereof include styrene, α-methylstyrene, and vinyl toluene.

Of these monomers, (meth)acrylates are preferred. Especially preferred are methyl (meth)acrylate, ethyl (meth)acrylate, isopropyl (meth)acrylate, n-butyl (meth)acrylate, isobutyl (meth)acrylate, n-hexyl (meth)acrylate, 2-ethylhexyl (meth)acrylate, isononyl (meth)acrylate, lauryl (meth)acrylate, cyclohexyl (meth)acrylate, 4-methylcyclohexyl (meth)acrylate, 4-t-butylcyclohexyl (meth)acrylate, isobornyl (meth)acrylate, dicyclopentanyl (meth)acrylate, and dicyclopentenyloxyethyl (meth)acrylate.

In the vinyl copolymer (A), the other copolymerizable monomer (a-3) may be used alone or in admixture of such monomers and in an amount of 10 to 94% by weight of the copolymer composition. It is preferred to copolymerize a (meth)acrylic monomer having a cyclic hindered amine structure because the resulting copolymer is photo-stabilized and improved in weather resistance. The content of the (meth)acrylic monomer having a cyclic hindered amine structure is preferably 0.1 to 10% by weight of the copolymer composition because more than 10% by weight of that monomer may adversely affect the adhesion of the coating.

The vinyl copolymer (A) serving as a main component in the primer composition of the invention is a vinyl copolymer of UV-absorbing vinyl monomer (a-1), alkoxysilyl group-containing vinyl monomer (a-2), and other copolymerizable monomer (a-3) as set forth above. The copolymer is readily obtained by dissolving the monomers in a solvent, adding a radical polymerization initiator to the monomer solution, and reacting the monomers under heat. Suitable radical polymerization initiators include peroxides such as dicumyl peroxide and benzoyl peroxide and azo compounds such as azobisisobutyronitrile.

The vinyl copolymer (A) preferably has a weight average molecular weight of about 1,000 to about 300,000.

To the vinyl copolymer (A) is added the curing agent (B) capable of reacting with the copolymer (A). The preferred curing agent is a compound containing a nitrogen atom and an alkoxysilyl group in a molecule, more preferably a compound containing at least one nitrogen atom and at least two alkoxysilyl groups in a molecule.

Preferred examples of the compound used herein include an amino group-containing alkoxysilane, amino group-containing di(alkoxysilane), amide group-containing alkoxysilane, the amide product obtained by reacting an amino group-containing alkoxysilane with an epoxy group-containing alkoxysilane and a silylating agent and amidating the reaction product, the reaction product of an amino group-containing alkoxysilane with a dicarboxylic anhydride, the reaction product of an amino group-containing alkoxysilane with a (poly)(meth)acrylic compound, the reaction product of an amino group-containing alkoxysilane with a (meth)acrylic group-containing alkoxysilane, the reaction product of a polyamine compound with a (meth)acrylic group-containing alkoxysilane, and the amide product obtained by reacting an amino group-containing alkoxysilane with a polyfunctional isocyanate compound and amidating the reaction product. Of these, preferred are the amide product obtained by reacting an amino group-containing alkoxysilane with an epoxy group-containing alkoxysilane and a silylating agent and amidating the reaction product, and the reaction product of an amino group-containing alkoxysilane with a dicarboxylic anhydride.

Illustrative examples of the components used herein are described. Examples of the amino group-containing alkoxysilane include 3-aminopropyltrimethoxysilane, 3-aminopropyltriethoxysilane, 3-aminopropylmethyldimethoxysilane, 3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, 3-(trimethoxysilylpropyl)aminopropyltrimethoxysilane, 3-(triethoxysilylpropyl)aminopropyltriethoxysilane, 2-(trimethoxysilylpropyl)aminoethyl-3-aminopropyltrimethoxysilane, and 2-(triethoxysilylpropyl)aminoethyl-3-aminopropyltriethoxy-silane.

A typical amino group-containing di(alkoxysilane) is bis(trimethoxysilylpropyl)amine.

Examples of the amide group-containing alkoxysilane include ureidopropyltrimethoxysilane, ureidopropyltriethoxysilane, ureidopropylmethyldimethoxysilane, and ureidopropylmethyldiethoxysilane.

Examples of the dicarboxylic anhydride include maleic anhydride, phthalic anhydride, tetrahydrophthalic anhydride, hexahydrophthalic anhydride, methyl-substituted tetrahydrophthalic anhydride, methyl-substituted hexahydrophthalic anhydride, 3,6-endo-methylenetetrahydrophthalic anhydride, and methyl-substituted-3,6-endo-methylenetetrahydrophthalic anhydride.

Examples of the (poly)(meth)acrylic compound include alkyl methacrylates such as methyl methacrylate, butyl methacrylate and 2-ethylhexyl methacrylate, alkyl acrylates such as methyl acrylate, ethyl acrylate and butyl acrylate, as well as acrylamide, acrylonitrile, and ethylene glycol dimethacrylate.

Examples of the polyamine compound include ethylene diamine, diethylene triamine, triethylene triamine, tetraethylene pentamine, and piperazine.

Examples of the polyisocyanate compound include toluene diisocyanate, diphenylmethane diisocyanate, hexamethylene diisocyanate, 2,2,4-trimethylhexamethylene diisocyanate, 2,4,4-trimethylhexamethylene diisocyanate, p-phenylene diisocyanate, 4,4'-dicyclohexylmethane diisocyanate, 3,3'-dimethyldiphenyl-4,4'-diisocyanate, dianisidine diisocyanate, m-xylene diisocyanate, isophorone diisocyanate, 1,5-naphthalene diisocyanate, trans-1,4-cyclohexyl diisocyanate, lysine diisocyanate, dimethyltriphenylmethane tetraisocyanate, triphenylmethane triisocyanate, and tris(phenyl isocyanate)thiophosphate.

Examples of the (meth)acrylic group-containing alkoxysilane are as exemplified above for the alkoxysilyl group-containing acrylic monomer.

The process of obtaining the amide compound by reacting an amino group-containing alkoxysilane with an epoxy group-containing alkoxysilane and a silylating agent and amidating the reaction product is described below. The amino group-containing alkoxysilane is as exemplified above although N-(2-aminoethyl)-3-aminopropyltrimethoxysilane and N-(2-aminoethyl)-3-aminopropylmethyldimethoxysilane are preferred for adhesion and operation. The epoxy group-containing alkoxysilane used herein is not critical although γ-glycidoxypropyltrimethoxysilane, γ-glycidoxypropylmethyldimethoxysilane, and β-(3,4-epoxycyclohexyl)ethylmethyldimethoxysilane are preferred for reactivity and operation. Examples of the silylating agent include hexamethyldisilazane, N,N'-bis(trimethylsilyl)formamide and N,N'-bis(trimethylsilyl)urea. When the amino group-containing alkoxysilane reacts with the epoxy group-containing alkoxysilane, the silylating agent serves to protect the OH groups generated by the reaction for preventing reaction between OH groups and alkoxysilyl groups, thereby precluding a change with time of the reaction product.

Reaction of the amino group-containing alkoxysilane with the epoxy group-containing alkoxysilane and the silylating agent may be effected by adding dropwise the epoxy group-containing alkoxysilane to a mixture of the amino group-containing alkoxysilane and the silylating agent and heating the mixture for reaction. Alternatively, the amino group-containing alkoxysilane is reacted with the epoxy group-containing alkoxysilane, and the silylating agent is added to the reaction product for further reaction.

In this reaction, the amino group-containing alkoxysilane and the epoxy group-containing alkoxysilane are preferably used in such amounts that the molar ratio of epoxy groups to amino (=N–H) groups may range from 0.3/1 to 1.2/1. If the molar ratio of epoxy/amino is less than 0.3, only a less number of alkoxy groups per molecule participate in crosslinking, leading to short cure, and the entire molecule is not spread, leading to a weak surface bond. If the molar ratio of epoxy/amino is more than 1.2, amino (=N–H) groups which can be amidated during subsequent amidation step become few, exacerbating water-resistant bond.

The reaction product is then amidated. For amidation, the reaction product may be reacted with a carboxylic acid halide, acid anhydride or acid isopropenyl ester such as, for example, acetic chloride, acetic bromide, propionic chloride, acetic anhydride, isopropenyl acetate or benzoyl chloride.

The reaction product of an amino group-containing alkoxysilane with a dicarboxylic anhydride is obtained as follows. The amino group-containing alkoxysilane used herein is as exemplified above although 3-aminopropyltrimethoxysilane, 3-aminopropyltriethoxysilane and 3-aminopropylmethyldiethoxysilane are preferred for adhesion and stability. The dicarboxylic anhydride used herein is as exemplified above although tetrahydrophthalic anhydride, hexahydrophthalic anhydride, methyl-substituted tetrahydrophthalic anhydride, methyl-substituted hexahydrophthalic anhydride, 3,6-endo-methylenetetrahydrophthalic anhydride, and methyl-substituted-3,6-endo-methylenetetrahydrophthalic anhydride are preferred for adhesion and stability.

Reaction of the amino group-containing alkoxysilane with the dicarboxylic anhydride may be effected by adding dropwise the amino group-containing alkoxysilane to the dicarboxylic anhydride or vice versa, and keeping conditions for reaction to take place.

In this reaction, the amino group-containing alkoxysilane and the dicarboxylic anhydride are preferably used in such amounts that the molar ratio of amino (—NH$_2$) groups to dicarboxylic anhydride may range from 0.3/1 to 1.8/1. If the molar ratio is less than 0.3, the reaction product contains only a less number of alkoxy groups participating in crosslinking, leading to short cure and a lowering of adhesion. If the molar ratio is more than 1.8, the primer composition may lose storage stability on account of amino groups on the unreacted amino group-containing alkoxysilane.

According to the invention, the thermoplastic vinyl resin (C) having a glass transition temperature (Tg) of at least 80° C. is used in conjunction with the vinyl copolymer (A) and the curing agent (B). The thermoplastic vinyl resin (C) used herein should preferably have a Tg of at least 80° C., and be highly dissolvable in a solvent used for the primer composition and well compatible with the vinyl copolymer (A) and the curing agent (B). Suitable thermoplastic resins include (meth)acrylic resins, (poly)styrene- or silicone-modified (meth)acrylic resins, (meth)acrylic urethane resins, and (meth)acrylic thiourethane resins. The preferred resin (C) is a thermoplastic vinyl resin obtained through copolymerization of 1 to 30% by weight of either one or both of (c-1) a UV-absorbing vinyl monomer and (c-2) a cycloalkyl group-containing vinyl monomer, and (c-3) 70 to 99% by weight of another monomer copolymerizable with the foregoing monomers and having a Tg of at least 80° C.

The UV-absorbing vinyl monomers (c-1) used herein include the aforementioned compounds of formulae (2) and (3), examples of which are as enumerated above. Inter alia, the benzotriazole derivatives of formula (2) are preferred. The cycloalkyl group-containing vinyl monomer (c-2) is not critical as long as it is a compound containing at least one cycloalkyl group and at least one vinyl group in a molecule. Preferred examples include cyclohexyl (meth)acrylate, 4-t-butylcyclohexyl (meth)acrylate, isobornyl (meth)acrylate, dicyclopentanyl (meth)acrylate, and adamantyl (meth)acrylate.

The total content of UV-absorbing vinyl monomer (c-1) and cycloalkyl group-containing vinyl monomer (c-2) in the thermoplastic vinyl resin (C) is 1 to 30% by weight, preferably 2 to 25% by weight of the copolymer composition when the compatibility of the thermoplastic vinyl resin (C) with other components of the primer composition and the weather resistance and water resistance of the primer composition are taken into account. More than 30% by weight of monomers (c-1) and (c-2) may result in a resin which is less compatible with other components of the primer composition and be uneconomical. Less than 1% by weight of monomers (c-1) and (c-2) may fail to achieve desired weather resistance, water resistance and heat resistance.

The other monomers (c-3) copolymerizable with the foregoing monomers are as exemplified above for monomer (a-3).

The thermoplastic vinyl resin (C) is preferably a copolymer of monomer (c-1) and/or monomer (c-2), and monomer (c-3) as set forth above. This copolymer should have a Tg of at least 80° C.

As used herein, the glass transition temperature is a theoretical glass transition temperature (Tg) calculated according to Fox's equation:

$$1/Tg = \Sigma(Wn/Tgn)/100$$

wherein Wn is the weight percent of a monomer n, and Tgn is the Tg (absolute temperature) of a homopolymer of monomer n. After the calculation, the Tg (absolute temperature) is converted to Tg in centigrade.

For the thermoplastic vinyl resin (C), the Tg is at least 80° C., and preferably at least 85° C. If Tg<80° C., the cured coating of a colloidal silica-laden organopolysiloxane composition formed on the coating of the primer composition is likely to crack. On outdoor use, the layered coating can crack in a relatively early stage and degrade by weathering.

Preferably the thermoplastic vinyl resin (C) has a weight average molecular weight of about 1,000 to about 800,000, more preferably about 5,000 to about 600,000.

In the primer composition of the invention, components (A), (B) and (C) described above are preferably compounded as follows.

The vinyl copolymer (A) and the thermoplastic vinyl resin (C) are preferably used in such amounts that components (A) and (C) account for 5 to 98% by weight and 95 to 2% by weight, respectively, provided that the total of components (A) and (C) is 100% by weight. More preferably, component (A) is 8 to 95% by weight, and component (C) is 92 to 5% by weight. Outside the range, too small amounts of component (A) may lead to a lowering of heat resistance whereas too large amounts of component (A) may allow for adhesion failure and cracking. Too small amounts of component (C) may result in a primer coating layer with a low crosslinked density and a too high Tg, which indicates that the primer coating layer is brittle or less adherent to the overlying organopolysiloxane composition.

On the other hand, the amount of the curing agent (B) added to the primer composition is preferably 0.1 to 50 parts by weight, more preferably 1 to 40 parts by weight per 100 parts by weight of the vinyl copolymer (A) and the thermoplastic vinyl resin (C) combined. Addition of more than 50 parts by weight of the curing agent (B) may result in a primer coating layer with too high a crosslinked density and hence, a high hardness, which is detrimental to adhesion.

In addition to the essential components (A) to (C) described above, the primer composition of the invention may contain any suitable optional components.

In the primer composition, a light stabilizer having at least one cyclic hindered amine structure in a molecule may be added for improving weather resistance. The light stabilizer used herein should preferably be fully soluble in the solvent for the primer composition, compatible with the primer composition, and low volatile. In the primer composition, 0.1 to 10 parts by weight of the light stabilizer is preferably blended per 100 parts by weight of components (A) and (C) combined. More than 10 parts of the light stabilizer may detract from adhesion of a coating.

Illustrative examples of the light stabilizer include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)-pyrrolidine-2,5-dione, N-acetyl-3-dodecyl-1-(2,2,6,6-tetramethyl-4-piperidinyl)-pyrrolidine-2,5-dione, bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl) 1,2,3,4-butane-tetracarboxylate, tetrakis(1,2,2,6,6-pentamethyl-4-piperidyl) 1,2,3,4-butane-tetracarboxylate, a condensate of 1,2,3,4-butanetetracarboxylic acid with 2,2,6,6-tetramethyl-piperidinol and tridecanol, 8-acetyl-3-dodecyl-7,7,9,9-tetramethyl-1,3,8-triazaspiro-[4,5]decane-2,4-dione, a condensate of 1,2,3,4-butanetetra-carboxylic acid with 1,2,2,6,6-pentamethyl-4-piperidinol and β,β,β,β'-tetramethyl-3,9-(2,4,8,10-tetraoxaspiro[5,5]-undecane)diethanol, and a condensate of 1,2,3,4-butanetetracarboxylic acid with 1,2,2,6,6-pentamethyl-4-piperidinol and β,β,β,β'-tetramethyl-3,9-(2,4,8,10-tetraoxaspiro[5,5]-undecane)diethanol. For the purpose of fixing the light stabilizer, there may be also used silyl-modified light stabilizers as disclosed in JP-B 61-56187, for example, 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, and 2,2,6,6-tetramethylpiperidino-4-propylmethyldiethoxysilane as well as (partial) hydrolyzates thereof. These light stabilizers may be used in admixture of two or more.

In the primer composition, a conventional ultraviolet absorber which is substantially free of polymerizable groups may be added insofar as no detrimental effect is exerted. Suitable UV absorbers are organic UV absorbers compatible with the primer composition. Derivatives of compounds having a hydroxybenzophenone, benzotriazole, cyanoacrylate or triazine main skeleton are especially preferred. Also acceptable are polymers such as vinyl polymers having such a UV absorber incorporated on a side chain. Exemplary UV absorbers are 2,4-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-methylphenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenyl acrylate, 2-ethylhexyl-2-cyano-3,3-diphenyl acrylate, 2-(2-hydroxy-4-hexyloxyphenyl)-4,6-diphenyltriazine, 2-hydroxy-4-(2-acryloxyethoxy)benzophenone copolymers, and 2-(2'-hydroxy-5'-methacryloxyethylphenyl)-2H-benzotriazole copolymers. These organic UV absorbers may be used in admixture of two or more.

Also, inorganic UV absorbers may be added as long as they do not adversely affect the primer composition. The inorganic UV absorbers should preferably be compatible and dispersible in the primer composition and maintain a coating filled therewith at a certain level of transparency without causing the coating to become white turbid. Examples include single or compound metal oxides in microparticulate form such as titanium oxide, cerium oxide, zinc oxide, tin oxide, zirconium oxide, antimony oxide, tungsten oxide, iron oxide, silica, and alumina, and mixtures thereof.

Such inorganic UV absorber is preferably added in an amount of 0.1 to 30 parts by weight, more preferably 0.3 to 20 parts by weight per 100 parts by weight of components (A), (B) and (C) combined.

On use, the primer composition is diluted with a solvent. Useful solvents include diacetone alcohol, propylene glycol monomethyl ether, ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetyl acetone, ethyl acetate, butyl acetate, xylene, and toluene. The primer composition is generally diluted with the solvent into a solution containing 5 to 20% by weight of the effective components prior to use.

By applying the primer composition solution to a surface of a pre-cleaned substrate such as plastic film, and evaporating the dilution solvent at room temperature or elevated temperature, a coating is formed preferably to a thickness of 0.5 to 20 μm, more preferably 1 to 15 μm. A coating of less than 0.5 μm may fail to provide desired weather resistance. A coating of more than 20 μm is inefficient to build up and may detract from the mechanical and optical properties the resin substrate inherently possesses.

For leveling the coating, a fluorochemical or silicone surfactant may be added in an effective amount. For promoting the cure of the coating, a crosslinking/curing catalyst may be added in a catalytic amount.

Molded plastic parts such as plastic films and substrates provided with a cured coating of the primer composition of the invention are improved in initial adhesion, heat resistance, resistance to hot water, and weather resistance. In one embodiment of the invention, any well-known organopolysiloxane composition, typically an organopolysiloxane composition comprising a hydrolyzate or co-hydrolyzate of an organooxysilane having the general formula (1):

$$(R^4)_m Si(OR^5)_{4-m} \qquad (1)$$

wherein $R^4$ is an organic group having 1 to 10 carbon atoms, $R^5$ is hydrogen or a monovalent organic group, and m is 0, 1 or 2, is applied to the coating of the primer composition and heat cured, preferably at a temperature of 50 to 140° C. whereby the molded plastic parts are double coated with the coating of the primer composition and the coating of the organopolysiloxane composition. The primer coating and the organopolysiloxane coating act in synergism to improve adhesion and abrasion resistance. Owing to the UV absorber fixedly incorporated within the primer coating, the overall coating exhibits improved weather resistance and weathering stability.

In formula (1), $R^4$ is an organic group which is typically selected from substituted or unsubstituted monovalent hydrocarbon groups of 1 to 10 carbon atoms, for example, alkyl groups, aryl groups, halogenated alkyl groups, halogenated aryl groups and alkenyl groups, and the foregoing hydrocarbon groups in which some of the hydrogen atoms are substituted with epoxy, (meth)acryloxy, mercapto, amino or cyano groups or which are separated by a hetero atom such as. O, NH or $NCH_3$. Illustrative examples of suitable organic groups include alkyl groups such as methyl, ethyl, propyl, isopropyl, butyl, hexyl, decyl and cyclohexyl; aryl groups such as phenyl and phenethyl; halogenated alkyl groups such as 3-chloropropyl, 3,3,3-trifluoropropyl, 3,3,4,4,5,5,6,6,6-nonafluorohexyl; halogenated aryl groups such as p-chlorophenyl; alkenyl groups such as vinyl, allyl, 9-decenyl, and p-vinylbenzyl; epoxy group-containing organic groups such as 3-glycidoxypropyl, β-(3,4-epoxycyclohexyl)ethyl, and 9,10-epoxydecyl; (meth)acryloxy group-containing organic groups such as γ-methacryloxypropyl and γ-acryloxy; mercapto group-containing organic groups such as γ-mercaptopropyl and p-mercaptomethylphenylethyl; amino group-containing organic groups such as γ-aminopropyl and (β-aminoethyl)-γ-aminopropyl; and cyano group-containing organic groups such as β-cyanoethyl.

$R^5$ is hydrogen or a monovalent organic group having 1 to 10 carbon atoms. Suitable organic groups include alkyl, alkenyl, alkoxyalkyl and acyl groups. Of these, the alkyl and acyl groups are preferred. Illustrative examples include methyl, ethyl, propyl, isopropyl, butyl, hexyl, phenyl, isopropenyl, methoxyethyl and acetyl.

Illustrative, non-limiting, examples of the silane compounds that satisfy the above conditions include trialkoxy or triacyloxysilanes such as methyltrimethoxysilane, methyltriethoxysilane, methyltris(2-methoxyethoxy)silane, methyltriacetoxysilane, methyltripropoxysilane, methyltriisopropenoxysilane, methyltributoxysilane, ethyltrimethoxysilane, ethyltriethoxysilane, vinyltrimethoxysilane, vinyltriethoxysilane, vinyltriacetoxysilane, vinyltris(2-methoxyethoxy)silane, vinyltriisopropenoxysilane, phenyltrimethoxysilane, phenyltriethoxysilane, phenyltriacetoxysilane, γ-chloropropyltrimethoxysilane, γ-chloropropyltriethoxysilane, γ-chloropropyltripropoxysilane, 3,3,3-trifluoropropyltrimethoxysilane, γ-glycidoxypropyltrimethoxysilane, γ-glycidoxypropylmethyldimethoxysilane, γ-glycidoxypropyltriethoxysilane, γ-glycidoxypropylmethyldiethoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethyltriethoxysilane, β-(3,4-epoxycyclohexyl)

ethylmethyldiethoxysilane,
γ-methacryloxypropyltrimethoxysilane, γ-acryloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-(β-aminoethyl)-γ-aminopropyltrimethoxysilane, and β-cyanoethyltrimethoxysilane;

dialkoxysilanes or diacyloxysilanes such as dimethyldimethoxysilane, dimethyldiethoxysilane, dimethyldi(2-methoxyethoxy)silane, dimethyldiacetoxysilane, dimethyldipropoxysilane, dimethyldiisopropenoxysilane, dimethyldibutoxysilane, vinylmethyldimethoxysilane, vinylmethyldiethoxysilane, vinylmethyldiacetoxysilane, vinylmethyldi(2-methoxyethoxy)silane, vinylmethyldiisopropenoxysilane, phenylmethyldimethoxysilane, phenylmethyldiethoxysilane, phenylmethyldiacetoxysilane, γ-propylmethyldimethoxysilane, γ-propylmethyldiethoxysilane, γ-propylmethyldipropoxysilane, 3,3,3-trifluoropropylmethyldimethoxysilane, γ-methacryloxypropylmethyldimethoxysilane, γ-acryloxypropylmethyldimethoxysilane, γ-aminopropylmethyldimethoxysilane, γ-aminopropylmethyldiethoxysilane, γ-mercaptopropylmethyldimethoxysilane, γ-mercaptopropylmethyldiethoxysilane, N-(β-aminoethyl)-γ-aminopropylmethyldimethoxysilane, and β-cyanoethylmethyldimethoxysilane; and tetraalkoxysilanes such as methyl silicate, ethyl silicate, n-propyl silicate, n-butyl silicate, sec-butyl silicate, and t-butyl silicate.

(Co—)hydrolyzates of these silane compounds are also useful. These silane compounds and/or (co—)hydrolyzates thereof may be used alone or in admixture of two or more.

The (co—)hydrolyzates of the above silane compounds are obtained, for example, by adding water to a lower alcohol solution of the silane compound(s) in the presence of an acid catalyst and effecting hydrolysis. Exemplary lower alcohols are methanol, ethanol, isopropanol and butanol. Solvents compatible with these alcohols include ketones such as acetone and acetylacetone, esters such as ethyl acetate and isobutyl acetate, and ethers such as propylene glycol monomethyl ether, dipropylene glycol monomethyl ether, and diisopropyl ether.

For improving mar resistance, it is preferred to apply a colloidal silica-laden organopolysiloxane composition in which 5 to 70% by weight of colloidal silica (obtained by dispersing silica fines having a particle size of about 1 to 100 nm in water or an alcohol such as methanol, ethanol, isobutanol or propylene glycol monomethyl ether) is added to the above organopolysiloxane composition.

As to the addition of colloidal silica, it may be simply added to the organopolysiloxane composition or it may be premixed with the above-mentioned silane compound(s) prior to hydrolysis. In the latter case, if water-dispersed colloidal silica is used, the water in the water-dispersed colloidal silica may be utilized as part or all of the water necessary for the hydrolysis of silane compounds.

A UV absorber may be added to the organopolysiloxane composition. Suitable UV absorbers include inorganic UV absorbers, for example, single or compound metal oxides in microparticulate form, such as titanium oxide, cerium oxide, zinc oxide, tin oxide, zirconium oxide, antimony oxide, tungsten oxide, iron oxide, silica, and alumina, and mixtures thereof; metal chelate compounds of titanium, zinc and zirconium, (partial) hydrolyzates and condensates thereof; organic UV absorbers, for example, derivatives of compounds having a hydroxybenzophenone, benzotriazole, cyanoacrylate or triazine main skeleton, and vinyl polymers having such a UV absorber incorporated on a side chain.

Also, a curing catalyst may be added in a catalytic amount to the organopolysiloxane composition. The curing catalyst is selected from quaternary ammonium salts, alkali metal salts of organic acids, alkoxides and chelates of aluminum, titanium, chromium and iron, perchlorates, acid anhydrides, polyamines, and Lewis acids, though not limited thereto.

The primer composition of the invention is advantageously applicable to a variety of plastic materials. The plastic substrates include those of polycarbonate, polystyrene, (meth)acrylic resins, urethane resins, thiourethane resins, polycondensates of halogenated bisphenol A and ethylene glycol, acrylic urethane resins, halogenated aryl group-containing acrylic resins, and sulfur-containing resins. The composition is also applicable to composite multilayer articles including two or more layers of these resins.

EXAMPLE

Examples of the invention are given below by way of illustration and not by way of limitation. All parts and percents are by weight. The viscosity is at 25° C. and in centipoise (cp) or centistoke (cs). Synthesis Examples are first described.

[Synthesis of UV-Absorbing Alkoxysilyl-Containing Vinyl Copolymer]

Synthesis Example 1

A 2-liter flask equipped with a stirrer, condenser and thermometer was charged with 152.3 g of diacetone alcohol as the solvent and heated at 80° C. in a nitrogen stream. To the flask were sequentially admitted a 240 g portion of a monomer mixture which had been previously prepared from 67.5 g of 2-[2'-hydroxy-5'-(2-methacryloxyethyl)phenyl]-2H-benzotriazole (RUVA-93 by Otsuka Chemical Co., Ltd.), 90 g of γ-methacryloxypropyltrimethoxysilane, 270 g of methyl methacrylate, 22.5 g of glycidyl methacrylate, and 350 g of diacetone alcohol, and a 54 g portion of a polymerization initiator solution which had been previously prepared by dissolving 2.3 g of 2,2'-azobis(2-methylbutyronitrile) in 177.7 g of diacetone alcohol. Reaction was effected at 80° C. for 30 minutes, after which the remainder of the monomer mixture and the remainder of the polymerization initiator solution were simultaneously added dropwise at 80–90° C. over 1.5 hours. The reaction solution was stirred at 80–90° C. for a further 5 hours.

The UV-absorbing alkoxysilyl group-containing vinyl copolymer solution thus obtained had a viscosity of 13,300 cp, the content of UV-absorbing monomer in the copolymer was 15%, and the content of alkoxysilyl group-containing monomer in the copolymer was 20%. The copolymer had a weight average molecular weight (Mw) of 81,000 as measured by GPC using polystyrene standards. This UV-absorbing alkoxysilyl group-containing vinyl copolymer (solution) is designated Pol-A1. Table 1 shows the type and amount of monomers and the properties of the vinyl copolymer Pol-A1.

Synthesis Examples 2 to 9

Vinyl copolymer solutions, designated Pol-A2 to A9, were prepared as in Synthesis Example 1 using the monomers in the amounts as reported in Table 1. Their properties are also shown in Table 1.

TABLE 1

| Synthesis Example | | 1 | 2 | 3 | 4 | 5 | 6 | 7 | 8 | 9 |
|---|---|---|---|---|---|---|---|---|---|---|
| a-1 | RUVA-1 | 67.5 (15%) | 36 (8%) | 67.5 (15%) | 90 (20%) | 9 (2%) | 225 (50%) | 67.5 (15%) | 67.5 (15%) | |
| | RUVA-2 | | | | | | | | | 67.5 (15%) |
| a-2 | MPTMS | 90 (20%) | | 9 (2%) | 180 (40%) | 90 (20%) | 45 (10%) | | 270 (60%) | 90 (20%) |
| | APTMS | | 90 (20%) | | | | | | | |
| a-3 | MMA | 270 (60%) | 297 (66%) | 283.5 (63%) | 135 (30%) | 328.5 (73%) | 180 (40%) | 270 (60%) | 112.5 (25%) | 270 (60%) |
| | GMA | 22.5 (5%) | 22.5 (5%) | 45 (10%) | | 22.5 (5%) | | 67.5 (15%) | | 22.5 (5%) |
| | EA | | | | 22.5 (5%) | 22.5 (5%) | | 22.5 (5%) | | |
| | ViAc | | | | 22.5 (5%) | 22.5 (5%) | | 22.5 (5%) | | |
| | MHALS | | 4.5 (1%) | | | | | | | |
| Total monomer charge | | 450 (100%) | 450 (100%) | 450 (100%) | 450 (100%) | 450 (100%) | 450 (100%) | 450 (100%) | 450 (100%) | 450 (100%) |
| Copolymer | | Pol-A1 | Pol-A2 | Pol-A3 | Pol-A4 | Pol-A5 | Pol-A6 | Pol-A7 | Pol-A8 | Pol-A9 |
| Viscosity (cp) | | 13,300 | 5,020 | 10,100 | 2,020 | 17,300 | 3,350 | 11,800 | 2,850 | 8,960 |
| Nonvolatile content (%) | | 44.5 | 43.8 | 42.9 | 44.2 | 44.8 | 43.0 | 43.7 | 44.3 | 43.5 |
| Mw | | 81,000 | 70,600 | 95,300 | 80,100 | 69,400 | 50,800 | 100,600 | 82,900 | 69,900 |

Note:
a-1: benzotriazole-derived UV-absorbing vinyl monomer
RUVA-1: 2-[2'-hydroxy-5'-(2-methacryloxyethyl)phenyl]-2H-benzotriazole (RUVA-93 by Otsuka Chemical Co., Ltd.)
RUVA-2: 2-hydroxy-4-(2-acryloxyethyl)benzophenone (BP-1A by Osaka Organic Chemical Industry Ltd.)
a-2: alkoxysilyl group-containing vinyl monomer
MPTMS: γ-methacryloxypropyltrimethoxysilane
APTMS: γ-acryloxypropyltrimethoxysilane
a-3: other copolymerizable monomer
MMA: methyl methacrylate
GMA: glycidyl methacrylate
EA: ethyl acrylate
ViAc: vinyl acetate
MHALS: 1,2,2,6,6-pentamethyl-4-piperidyl methacrylate

[Synthesis of Compound having Nitrogen Atom and Alkoxysilyl Group in a Molecule]

Synthesis Example 10

A 2-liter flask equipped with a stirrer, condenser and thermometer was charged with 222 g of N-(2-aminoethyl)-3-aminopropyltrimethoxysilane and 242 g of hexamethyldisilazane as the silylating agent and heated at 120° C. in a nitrogen stream. Then 496 g of γ-glycidoxypropylmethyldiethoxysilane was added dropwise to the solution, which was heated and stirred at 120° C. for 5 hours for reaction. A low-boiling fraction was removed at 100° C. under reduced pressure, obtaining 862 g of a viscous product having a viscosity of 1,387 cs, a refractive index of 1.4618 and a specific gravity of 1.048.

Next, a 2-liter flask equipped with a stirrer, condenser and thermometer was charged with 862 g of the reaction product and 862 g of toluene. Under a nitrogen stream, 141 g of acetic anhydride was added dropwise to the solution at room temperature. The solution was heated and stirred at 110° C. for 2 hours for reaction. Then 141 g of methanol was added dropwise to the solution at 50° C., followed by heating and stirring at 50° C. for 1 hour. A low-boiling fraction was removed at 100° C. under reduced pressure, obtaining a reddish brown, clear, highly viscous compound.

On IR absorption spectroscopy of this compound, no absorption peaks attributable to OH or NH group appeared in the region of 3,000 $cm^{-1}$ or greater, whereas a strong absorption attributable to amide group was found at 1,650 $cm^{-1}$.

The compound was diluted with PGM to a nonvolatile content of 25% (JIS K6833). This nitrogen/alkoxysilyl group-containing compound (solution) is designated NSi-1.

Synthesis Example 11

A 2-liter flask equipped with a stirrer, condenser and thermometer was charged with 178 g of methyl-3,6-endomethylene-1,2,3,6-tetrahydrophthalic anhydride and 399 g of ethanol and cooled below 10° C. in a nitrogen stream. Then 221 g of 3-aminopropyltriethoxysilane was added dropwise to the solution, which was stirred at room temperature for 5 hours for reaction. Then 798 g of ethanol was added, followed by one hour of stirring at room temperature. There was obtained 1,588 g of a reddish brown, clear compound solution having a viscosity of 2.85 cs, a refractive index of 1.4048 and a specific gravity of 0.918. This nitrogen/alkoxysilyl group-containing compound (solution) is designated NSi-2.

[Synthesis of Thermoplastic Vinyl Resin with Tg≧80° C.]

Synthesis Example 12

A 2-liter flask equipped with a stirrer, condenser and thermometer was charged with 152.3 g of diacetone alcohol as the solvent and heated at 80° C. in a nitrogen stream. To the flask were sequentially admitted a 240 g portion of a monomer mixture which had been previously prepared from 45 g of 2-[2'-hydroxy-5'-(2-methacryloxyethyl)phenyl]-2H-benzotriazole (RUVA-93 by Otsuka Chemical Co., Ltd.), 405 g of methyl methacrylate, and 350 g of diacetone alcohol, and a 54 g portion of a polymerization initiator solution which had been previously prepared by dissolving 1.0 g of 2,2'-azobis(2-methylbutyronitrile) in 177.7 g of diacetone alcohol. Reaction was effected at 80° C. for 30 minutes, after which the remainder of the monomer mixture and the remainder of the polymerization initiator solution were simultaneously added dropwise at 80–90° C. over 1.5 hours. The reaction solution was stirred at 800–90° C. for a further 5 hours.

The thermoplastic vinyl resin solution thus obtained had a viscosity of 6,200 cp, and the content of UV-absorbing monomer in the resin was 10%. The resin had a theoretical Tg of 101° C. as calculated from the monomers used. The resin had a weight average molecular weight (Mw) of 186,600 as measured by GPC using polystyrene standards. This thermoplastic vinyl resin (solution) is designated Pol-C1. Table 2 shows the type and amount of monomers and the properties of the thermoplastic vinyl resin Pol-C1.

Synthesis Examples 13 to 16

Thermoplastic vinyl resin solutions, designated Pol-C2 to C5, were prepared as in Synthesis Example 12 using the monomers in the amounts as reported in Table 2. Their properties are also shown in Table 2.

TABLE 2

| Synthesis Example | | 12 | 13 | 14 | 15 | 16 |
|---|---|---|---|---|---|---|
| c-1 | RUVA-1 | 45 (10%) | | | 22.5 (5%) | 22.5 (5%) |
| c-2 | IBMA | | 22.5 (5%) | | | |
| | CHMA | | | 112.5 (25%) | | 67.5 (15%) |
| | DCPMA | | | | 67.5 (15%) | |
| c-3 | MMA | 405 (90%) | 427.5 (95%) | 337.5 (75%) | 360 (80%) | 292.5 (65%) |
| | BA | | | | | 67.5 (15%) |
| Total monomer charge | | 450 (100%) | 450 (100%) | 450 (100%) | 450 (100%) | 450 (100%) |
| Copolymer | | Pol-C1 | Pol-C2 | Pol-C3 | Pol-C4 | Pol-C5 |
| Viscosity (cp) | | 6,200 | 1,090 | 2,040 | 5,120 | 7,550 |
| Nonvolatile content (%) | | 43.2 | 38.9 | 34.0 | 44.5 | 40.6 |
| Mw | | 186,600 | 82,800 | 95,600 | 108,000 | 178,200 |
| Theory Tg (° C.) | | 101 | 108 | 94 | 112 | 60 |

Note:
c-1: benzotriazole-derived UV-absorbing vinyl monomer
RUVA-1: 2-[2'-hydroxy-5'-(2-methacryloxyethyl)phenyl]-2H-benzotriazole (RUVA-93 by Otsuka Chemical Co., Ltd., homopolymer's Tg = 71° C.)
c-2: cycloalkyl group-containing vinyl monomer
IBMA: isobornyl methacrylate (homopolymer's Tg = 180° C.)
CHMA: cyclohexyl methacrylate (homopolymer's Tg = 66° C.)
DCPMA: dicyclopentanyl methacrylate (homopolymer's Tg = 175° C.)
c-3: other copolymerizable monomer
MMA: methyl methacrylate (homopolymer's Tg = 105° C.)
BA: butyl acrylate (homopolymer's Tg = −55° C.)

[Synthesis of Colloidal Silica-Laden Organopolysiloxane Compositions]

Synthesis Example 17

A 1-liter flask equipped with a stirrer, condenser and thermometer was charged with 336 g of methyltriethoxysilane and 94 g of isobutanol, which were maintained below 5° C. under ice cooling with stirring. To this was added 283 g of water-dispersed colloidal silica (Snowtex O, average particle size 15–20 nm, $SiO_2$ content 20%, by Nissan Chemical Co., Ltd.) below 5° C. The mixture was stirred for 3 hours under ice cooling and for a further 12 hours at 20–25° C. Thereafter, 27 g of diacetone alcohol and 50 g of propylene glycol monomethyl ether were added. Then 3 g of a 10% aqueous solution of sodium propionate and 0.2 g of polyether-modified silicone KP-341 (Shin-Etsu Chemical Co., Ltd.) as the leveling agent were added. The resulting mixture was adjusted to pH 6–7 with acetic acid. This was adjusted with isobutanol to a nonvolatile content of 20% as measured by JIS K-6833 and ripened for 5 days at room temperature. The resulting colloidal silica-laden organopolysiloxane composition had a viscosity of 4.2 cs, and the weight average molecular weight was about 1,100 as measured by GPC. This colloidal silica-laden organopolysiloxane composition is designated HC-1.

Synthesis Example 18

A 1-liter flask equipped with a stirrer, condenser and thermometer was charged with 268 g of methyltriethoxysilane, 17 g of 3,3,3-trifluoropropyltrimethoxysilane, 76 g of isobutanol, and 0.2 g of acetic acid, which were maintained below 5° C. under ice cooling with stirring. To this were added 151 g of water-dispersed colloidal silica (Snowtex OS, average particle size 8–11 nm, $SiO_2$ content 20%, by Nissan Chemical Co., Ltd.) and 8 g of deionized water below 5° C. The mixture was stirred for 3 hours under ice cooling. There were further added 43 g of isobutanol-dispersed colloidal silica (IBA-ST-20, $SiO_2$ content 20%, by Nissan Chemical Co., Ltd.) and 13 g of isobutanol. The mixture was stirred for 12 hours at 20–25° C. and heated and stirred at 60° C. for a further 6 hours. After the mixture was cooled to room temperature, 76 g of diacetone alcohol and 140 g of propylene glycol monomethyl ether were added. Then 3 g of a 10% methanol solution of benzyltrimethylammonium hydroxide, 0.3 g of a 10% aqueous solution of sodium acetate, and 0.2 g of polyether-modified silicone KP-341 (Shin-Etsu Chemical Co., Ltd.) as the leveling agent were added. The resulting mixture was adjusted with isobutanol to a nonvolatile content of 20% as measured by JIS K-6833. The resulting colloidal silica-laden organopolysiloxane composition had a viscosity of 4.9 cs, and the weight average molecular weight was about 1,300 as measured by GPC. This colloidal silica-laden organopolysiloxane composition is designated HC-2.

Now, Examples of the invention are given together with Comparative Examples. The abbreviations other than those in Synthesis Examples have the following meaning.

N/alkoxysilyl Group-Containing Compound

NSi-3: ureidopropyltriethoxysilane (KBE-585, Shin-Etsu Chemical Co., Ltd.)

UV Absorbers

UVA-1: 2,2′,4,4′-tetrahydroxybenzophenone

UVA-2: 2-[4-[(2-hydroxy-3-dodecyl/tridecyl-oxypropyl)oxy]-2-hydroxyphenyl]-4,6-bis(2,4-dimethylphenyl)-1,3,5-triazine (Tinuvin 400 by Ciba Specialty Chemicals)

UVA-3: a copolymer of 2-(2′-hydroxy-5′-methacryloxy-ethyl-phenyl)-2H-benzotriazole (30%) and methyl methacrylate (70%) (PUVA-30M by Otsuka Chemical Co., Ltd., 10% diacetone alcohol solution)

UVA-4: microparticulate cerium oxide (U-100 by Taki Chemical Co., Ltd., 10% isobutanol dispersion)

UVA-5: 20% methanol dispersion of titanium oxide-containing compound metal oxide sol (1120Z by Catalysts & Chemicals Industry Co., Ltd.)

UVA-6: a chelated titanium hydrolytic condensate obtained by chelating tetrapropyl titanate (1 mol) with acetyl acetone (2 mol) and hydrolyzing with 7% aqueous ammonia (methanol solution with a nonvolatile content 20%)

Hindered Amine Light Stabilizers

HALS-1: N-acetyl-3-dodecyl-1-(2,2,6,6-tetramethyl-4-piperidinyl)pyrrolidine-2,5-dione (Sanduvor 3058 liquid by Clariant)

In Examples, physical properties were measured and rated by the following procedures.

The primer composition and the colloidal silica-laden organopolysiloxane composition were sequentially applied and cured onto a substrate to form a coated sample.

(1) Initial Coating Appearance

The outer appearance of the coating on the sample was visually observed.

(2) Primary Adhesion

An adhesive tape test was carried out according to JIS K-5400 by scribing the sample with a razor along six spaced 2-mm apart orthogonal lines to define 25 square sections in the coating, closely pressing a commercially available adhesive tape thereto, and quickly peeling the adhesive tape by an angle of 90 degrees. The number (X) of remaining (not peeled) coating sections is expressed as X/25.

(3) Water Resistance and Adhesion after Water Immersion

The sample was immersed in boiling water for 2 hours, after which the outer appearance was visually observed and the adhesive tape test was carried out as in (2).

(4) Marring Test

Using a Taber abrader equipped with an abrasive wheel CS-10F, the sample was rotated under a load of 500 g according to ASTM 1044. After 500 revolutions, the sample was measured for haze. A Taber abrasion (%) or mar resistance was calculated as the haze after test minus the haze prior to test.

(5) Weathering Test

Using a Eye Super UV Tester by Iwasaki Electric Co., Ltd., a weathering test was carried out. One cycle consisted of 5 hour holding at black panel temperature 63° C., relative humidity 50%, illuminance 50 mW/cm$^2$, and raining 10 seconds/hour, and 1 hour holding at black panel temperature 30° C. and relative humidity 95%. The weathering cycles were repeated over 250 hours and 500 hours. Before and after the test, a yellowing factor was determined according to JIS K-7103. The sample was observed with naked eyes and under a microscope (×250) to examine whether the weather resistant coating cracked or separated.

Coating Cracks

The outer appearance of the coating after the weathering test was evaluated according to the following criterion.

○: sound

Δ: a few cracks

X: cracks over entire coating

Coating Separation

The state of the coating after the weathering test was evaluated according to the following criterion.

○: sound

Δ1: partial separation between the colloidal silica-laden organopolysiloxane layer and the primer layer Δ2: partial separation between the primer layer and the substrate X1: overall separation between the colloidal silica-laden organopolysiloxane layer and the primer layer X2: overall separation between the primer layer and the substrate Examples 1 to 9 & Comparative Examples 1 to 7

Primer compositions A through Q were prepared according to the formulation shown in Tables 3 and 4 by mixing the alkoxysilyl group-containing UV-absorbing vinyl copolymer (Pol-A1 to A9), nitrogen/alkoxysilyl group-containing compound (NSi-1 to 3), and thermoplastic vinyl resin (Pol-C1 to C6), prepared in Synthesis Examples 1 to 17, the UV absorber (UVA-1 to 6) and light stabilizer (HALS-1) as the additive, and diluting the mixture with a 20/80 mixed solvent of diacetone alcohol and propylene glycol monomethyl ether to a total solids concentration of 15%.

Each primer composition was applied onto a cleaned surface of a polycarbonate resin sheet of 0.5 mm thick (Iupilon Sheet by Mitsubishi Engineering-Plastics Corp.) by the flow coating method and cured at 120° C. for 30 minutes, obtaining a cured primer coating of about 6 to 8 μm thick. Each of the colloidal silica-laden organopolysiloxane coating compositions (HC-1 to 2) prepared in Synthesis Examples 18 and 19, with which the UV absorber (UVA-1 to 6) or light stabilizer (HALS-1) as additive was admixed, was applied onto the primer coating by the flow coating method and cured at 130° C. for one hour, obtaining a cured coating of about 4 to 5 μm thick. The coated sheets thus obtained, i.e., samples were examined by the above-mentioned tests. The test results are shown in Tables 3 and 4.

TABLE 3

| Example | 1 | 2 | 3 | 4 | 5 | 6 | 7 | 8 | 9 |
| --- | --- | --- | --- | --- | --- | --- | --- | --- | --- |
| Primer composition | A | B | C | D | E | F | G | H | I |
| UV-absorbing vinyl copolymer | Pol-A1 100 pbw | Pol-A2 100 pbw | Pol-A3 100 pbw | Pol-A4 100 pbw | Pol-A1 100 pbw | Pol-A3 100 pbw | Pol-A4 100 pbw | Pol-A2 100 pbw | Pol-A9 100 pbw |
| N/alkoxysilyl-containing compound | Nsi-1 20 pbw | Nsi-1 33 pbw | Nsi-2 33 pbw | Nsi-1 30 pbw | Nsi-2 20 pbw | Nsi-3 20 pbw | Nsi-2 5 pbw | Nsi-3 30 pbw | Nsi-1 20 pbw |
| Thermoplastic vinyl resin | Pol-C1 35 pbw | Pol-C2 10 pbw | Pol-C3 25 pbw | Pol-C4 80 pbw | Pol-C2 15 pbw | Pol-C4 35 pbw | Pol-C2 15 pbw | Pol-C1 35 pbw | Pol-C2 25 pbw |

TABLE 3-continued

| Example | 1 | 2 | 3 | 4 | 5 | 6 | 7 | 8 | 9 |
|---|---|---|---|---|---|---|---|---|---|
| Primer composition | A | B | C | D | E | F | G | H | I |
| Additive | | | UVA-2 2 pbw | UVA-3 3 pbw HALS-1 1 pbw | UVA-3 5 pbw | | HALS-1 1 pbw | UVA-4 1 pbw | |
| Colloidal silica-laden organopolysiloxane composition | HC-1 100 pbw | HC-2 100 pbw | HC-1 100 pbw | HC-1 100 pbw | HC-2 100 pbw | HC-2 100 pbw | HC-1 100 pbw | HC-2 100 pbw | HC-1 100 pbw |
| Additive | | | UVA-1 3 pbw | UVA-5 3 pbw | UVA-6 6 pbw | UVA-5 2 pbw UVA-6 5 pbw | UVA-5 1.5 pbw | UVA-6 6 pbw | |
| Test results | | | | | | | | | |
| Initial coating appearance | sound | sound | sound | sound | sound | sound | sound | sound | sound |
| Primary adhesion | 25/25 | 25/25 | 25/25 | 25/25 | 25/25 | 25/25 | 25/25 | 25/25 | 25/25 |
| Appearance after water immersion | sound | sound | sound | sound | sound | sound | sound | sound | sound |
| Adhesion after water immersion | 25/25 | 25/25 | 25/25 | 25/25 | 25/25 | 25/25 | 25/25 | 25/25 | 25/25 |
| Mar resistance (%) | 2 | 3 | 5 | 6 | 3 | 7 | 4 | 3 | 3 |
| Weather resistance | | | | | | | | | |
| After 250 hours | | | | | | | | | |
| Yellowing factor | <1 | <1 | 1 | <1 | <1 | <1 | <1 | <1 | <1 |
| Coating cracks | ○ | ○ | ○ | ○ | ○ | ○ | ○ | ○ | ○ |
| Coating separation | ○ | ○ | ○ | ○ | ○ | ○ | ○ | ○ | ○ |
| After 500 hours | | | | | | | | | |
| Yellowing factor | 2 | 3 | 6 | 1 | 4 | 1 | 1 | 3 | 3 |
| Coating cracks | ○ | ○ | ○ | ○ | ○ | ○ | ○ | ○ | ○ |
| Coating separation | ○ | ○ | Δ1 | ○ | ○ | ○ | ○ | ○ | ○ |

TABLE 4

| Comparative Example | 1 | 2 | 3 | 4 | 5 | 6 | 7 |
|---|---|---|---|---|---|---|---|
| Primer composition | J | K | L | M | N | O | P |
| UV-absorbing vinyl copolymer | Pol-A1 100 pbw | Pol-A2 100 pbw | Pol-A5 100 pbw | Pol-A6 100 pbw | Pol-A7 100 pbw | Pol-A8 100 pbw | Pol-A1 100 pbw |
| N/alkoxysilyl-containing compound | NSi-1 20 pbw | | NSi-1 33 pbw | NSi-1 30 pbw | NSi-2 20 pbw | NSi-1 20 pbw | NSi-2 20 pbw |
| Thermoplastic vinyl resin | | Pol-C2 10 pbw | Pol-C1 35 pbw | Pol-C1 35 pbw | Pol-C1 35 pbw | Pol-C2 35 pbw | Pol-C5 35 pbw |
| Additive | | | | | | | |
| Colloidal silica-laden organopolysiloxane composition | HC-1 100 pbw | HC-2 100 pbw | HC-1 100 pbw | HC-1 100 pbw | HC-1 100 pbw | HC-1 100 pbw | HC-2 100 pbw |
| Additive | | | | | | | |
| Test results | | | | | | | |
| Initial coating appearance | sound | sound | sound | whitened | sound | sound | sound |
| Primary adhesion | 25/25 | 25/25 | 25/25 | 25/25 | 23/25 | 25/25 | 25/25 |
| Appearance after water immersion | partially cracked | whitened | sound | whitened | whitened | cracked | sound |
| Adhesion after water immersion | 25/25 | 20/25 | 25/25 | 0/25 | 0/25 | 25/25 | 25/25 |
| Mar resistance (%) | 2 | 3 | 2 | 2 | 3 | 2 | 3 |
| Weather resistance | | | | | | | |
| After 250 hours | | | | | | | |
| Yellowing factor | 1 | 2 | 6 | <1 | 4 | 3 | 2 |
| Coating cracks | Δ | ○ | ○ | ○ | ○ | Δ | Δ |
| Coating separation | ○ | Δ1 | Δ1 | X1 | Δ1 | ○ | ○ |
| After 500 hours | | | | | | | |
| Yellowing factor | 12 | 21 | 23 | 25 | 18 | 10 | 9 |
| Coating cracks | X | Δ | Δ | X | Δ | X | X |
| Coating separation | X1 | X1, X2 | X1, X2 | X1, X2 | X1, X2 | Δ1, Δ2 | Δ1 |

Plastic articles, especially polycarbonate resin articles, when covered with coatings of the primer compositions according to the invention, are endowed with improved transparency, mar resistance, weather resistance, and chemical resistance. They find outdoor use as windows and windshields on vehicles like automobiles and aircraft, windows in buildings, noise-barrier walls and the like.

Japanese Patent Application No. 2002-295905 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A primer composition comprising,
   (A) a vinyl copolymer obtained through copolymerization of (a-1) 5 to 40% by weight of a UV-absorbing vinyl monomer, (a-2) 1 to 50% by weight of an alkoxysilyl group-containing vinyl monomer, and (a-3) 10 to 94% by weight of another monomer copolymerizable with the foregoing monomers,
   (B) a curing agent capable of reacting with the vinyl copolymer (A), wherein said curing agent (B) is a compound containing a nitrogen atom and an alkoxysilyl group in a molecule, and
   (C) a thermoplastic vinyl resin having a glass transition temperature of at least 80° C.

2. The primer composition of claim 1 wherein the UV-absorbing vinyl monomer (a-1) is a UV-absorbing vinyl monomer derived from a benzotriazole.

3. The primer composition of claim 1 wherein the curing agent (B) is the reaction product obtained through amidation of the reaction product of an amino-functional alkoxysilane, an epoxy-functional alkoxysilane, and a silylating agent with a carboxylic acid halide or carboxylic anhydride.

4. The primer composition of claim 1 wherein the curing agent (B) is the reaction product of an amino-functional alkoxysilane with a dicarboxylic anhydride.

5. The primer composition of claim 1 wherein the thermoplastic vinyl resin (C) is a thermoplastic vinyl resin obtained through copolymerization of 1 to 30% by weight of either one or both of (c-1) a UV-absorbing vinyl monomer and (c-2) a cycloalkyl group-containing vinyl monomer, and (c-3) 70 to 99% by weight of another monomer copolymerizable with the foregoing monomers and having a glass transition temperature of at least 80° C.

6. The primer composition of claim 5 wherein the UV-absorbing vinyl monomer (c-1) is a UV-absorbing vinyl monomer derived from a benzotriazole.

7. The primer composition of claim 5 wherein the cycloalkyl group-containing vinyl monomer (c-2) is at least one member selected from the group consisting of cyclohexyl acrylate, cyclohexyl methacrylate, dicyclopentanyl acrylate, dicyclopentanyl methacrylate, isobornyl acrylate, isobornyl methacrylate, adamantyl acrylate, and adamantyl methacrylate.

8. A method for providing a plastic substrate with a weather resistant, abrasion resistant coating, comprising the steps of:
   (i) applying an organic solvent solution of a primer composition as set forth in claim 1 onto a plastic substrate,
   (ii) evaporating the solvent and curing the primer coating,
   (iii) applying an organopolysiloxane composition to the primer coating, the organopolysiloxane composition comprising a hydrolyzate or co-hydrolyzate of an organooxysilane having the general formula (1):

$(R^4)_m Si(OR^5)_{4-m}$ \hfill (1)

wherein $R^4$ is an organic group having 1 to 10 carbon atoms, $R^5$ is hydrogen or a monovalent organic group, and m is 0, 1 or 2, and
   (iv) heating at a temperature sufficient for the composition to cure.

9. The method of claim 8 wherein said organopolysiloxane composition further comprises colloidal silica.

10. The method of claim 8 wherein said plastic substrate comprises a polycarbonate resin.

11. A resin coated article comprising at least two resin layers on a surface of a plastic substrate, wherein of the at least two resin layers,
   a first layer which is contiguous to the substrate surface is a cured resin layer of a primer composition as set forth in claim 1, and
   a second layer which is contiguous to the first layer is a cured resin layer of an organopolysiloxane composition comprising a hydrolyzate or co-hydrolyzate of an organooxysilane having the general formula (1):

$(R^4)_m Si(OR^5)_{4-m}$ \hfill (1)

wherein $R^4$ is an organic group having 1 to 10 carbon atoms, $R^5$ is hydrogen or a monovalent organic group, and m is 0, 1 or 2, and optionally, colloidal silica.

12. The resin coated article of claim 11 wherein said plastic substrate comprises a polycarbonate resin, polystyrene, a (meth)acrylic resin, a urethane resin, a thiourethane resin, a polycondensate of halogenated bisphenol A and ethylene glycol, an acrylic urethane resin, a halogenated aryl group-containing acrylic resin, or a sulfur-containing resin.

13. The resin coated article of claim 12 wherein said plastic substrate comprises a polycarbonate resin.

14. The primer composition of claim 2, wherein the alkoxysilyl group-containing vinyl monomer (a-2) is a compound having the general formula (4)

$R^9-R^{10}{}_n-Si(R^{11})_{3-L}(OR^{12})_L$ \hfill (4)

wherein $R^9$ is a polymerizable unsaturated group, $R^{10}$ is a straight or branched alkylene group having 1 to 10 carbon atoms, $R^{11}$ and $R^{12}$ are each independently an alkyl group having 1 to 6 carbon atoms, L is an integer of 1 to 3, and n is 0 or 1, and wherein copolymerizable monomer (a-3) is a (meth)acrylic monomer having a cyclic hindered amine structure, a (meth)acrylic acid ester, a (meth)acrylonitrile, a (meth)acrylamide, an alkyl vinyl ether, an alkyl vinyl ester, or styrene.

15. The primer composition of claim 5, wherein copolymerizable monomer (c-3) is a (meth)acrylic monomer having a cyclic hindered amine structure, a (meth)acrylic acid ester, a (meth)acrylonitrile, a (meth)acrylamide, an alkyl vinyl ether, an alkyl vinyl ester, or styrene.

16. The method of claim 9 for providing a plastic substrate with a weather resistant, abrasion resistant coating, wherein said organopolysiloxane composition contains 5 to 70% by weight of colloidal silica.

* * * * *